Figure 1:
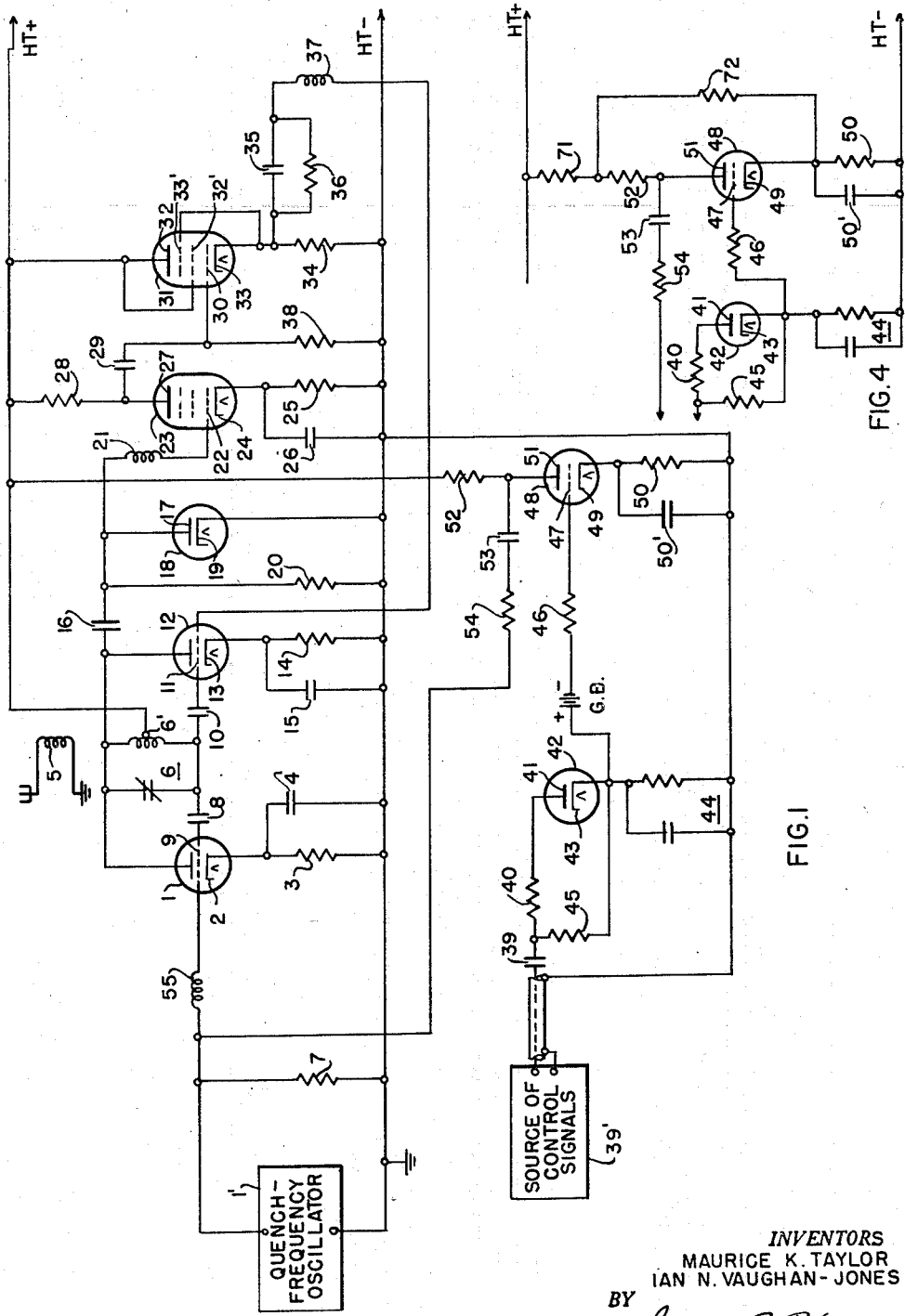

June 30, 1953

M. K. TAYLOR ET AL 2,644,078

WAVE SIGNAL TRANSPONDER SYSTEM

Filed Aug. 5, 1947

2 Sheets-Sheet 2

*INVENTORS*
MAURICE K. TAYLOR
IAN N. VAUGHAN-JONES

BY John A. Harvey

ATTORNEY

UNITED STATES PATENT OFFICE 2,644,078

WAVE SIGNAL TRANSPONDER SYSTEM

Maurice K. Taylor and Ian N. Vaughan-Jones, Hollinwood, England, assignors to Ferranti Limited, Hollinwood, England, a corporation of Great Britain Application August 5, 1947, Serial No. 766,393
In Great Britain December 21, 1945

Section 1, Public Law 690, August 8, 1946
Patent expires December 21, 1965

7 Claims. (Cl. 250—15)

This invention relates to superregenerative wave-signal receivers associated with wave-signal transmitters to provide a system usually known as a wave-signal "transponder" system and often referred to by its earlier designation of wave-signal "responder" system. It is the purpose of a transponder or responder system to receive interrogating wave-signal pulses from a remote transmitting station, for example a ground radar station, to modify the wave form of such signal pulses in a manner predetermined in accordance with the nature or identity of the object in which the responder is transported, and then to transmit the modified signal pulses at the original or at a different carrier frequency as response signals, thereby providing to the remote station an indication of the nature or identity of the object. Such a receiver and transmitter system is herein referred to as being "a responder of the type stated." It is usually a characteristic of such a responder that its receiving frequency and, frequently also its transmitting frequency, is varied cyclically over a band of frequencies.

When a responder of the type stated is operated in proximity to radio detecting and ranging equipment, now known as radar equipment and sometimes referred to broadly as interrogator-responser equipment, employing a pulse-modulated exploring wave-signal radiated beam and usually a cathode-ray tube signal-display system, mutual interference may occur. For example it is sometimes necessary, for practical reasons, to operate the nearby radar equipment at a fixed frequency which is near to or coincides with the frequency or one of those frequencies at which the responder operates. In consequence, the radar equipment picks up the response-signal output from the responder occurring at or near its own frequency. These response signals may seriously obscure the cathode-ray tube display scans in the radar equipment since such obscuring signals will not appear in the same position along each of the recurrent scans of the radar display owing to the recurrence frequency of the pulses transmitted from the responder being non-synchronized with the recurrence frequency of the radar cathode-ray tube scans. Other obscuring signals may occur even if the responder is not responding to any remote station because of the radiation which is characteristic of its super-regenerative receiving stage.

Furthermore, when the nearby radar equipment is operating, the pulse-modulated wave signal radiated therefrom may be of large amplitude and may trigger the nearby responder of the type stated. If triggering does occur a response wave-signal pulse is retransmitted from the responder and is picked up by the radar equipment where it appears at the beginning of the radar cathode-ray tube scans. Such spurious signals always occur at the same position along each recurrent scan and, as the duration of the responder wave-signal pulses may be appreciable when compared with the time taken to trace out each of the display scans, a large part of the radar display may be rendered useless. This form of interference may frequently occur even if the radar and responder equipments operate at different frequencies, owing to the lack of selectivity of the receiver circuits of the responder. An additional disadvantage of such triggering is the useless load imposed on the responder.

It is an object of this invention, therefore, to provide a new and improved wave-signal responder system which substantially avoids one or more of the limitations and disadvantages of prior arrangements.

It is also an object of the invention to provide a new and improved wave-signal responder system capable of operating in the neighborhood of pulse-modulated radar equipment at similar wave-signal frequencies with a minimum of mutual interference therebetween.

It is a further object of the invention to provide a new and improved wave-signal responder system which has reduced tendency to respond to the pulse-modulated signals transmitted by an associated radar equipment.

In accordance with the invention, a wave-signal transponder system, adapted for use in association with a nearby pulse-modulated radar or interrogator-responser equipment which in each operating period thereof transmits a signal pulse of a given carrier frequency and utilizes a reply signal pulse of a related carrier frequency returned within a predetermined interval following the transmission of the first-mentioned signal pulse, comprises pulse-modulation receiver and transmitter means including a control circuit for energizing the transmitter unit of the aforesaid means in response to the reception of a signal pulse by the receiver unit thereof. The receiver unit is subject to the undesired reception of wave-signal energy resulting from the operation of the interrogator-responser equipment. The wave-signal transponder system also includes an input circuit to which is applied a potential change initiated not later than the start of each operating period of the interrogator-responser equipment. The system further includes means, including a circuit network having a relatively long time constant, and having a unilaterally conductive device coupled thereto for developing in response to the potential change just mentioned a control-voltage pulse having a trailing edge of extended exponential form and having a duration at least equal to each operating period of the interrogator-responser equipment. The transpondor system also includes means for applying the control-voltage pulse to at least one of the aforesaid units effectively to disable at least said one unit during each operating period of the interrogator-responser equipment to prevent undesirable interference otherwise produced by the operation of the receiver and transmitter means in response to the reception of wave-signal energy resulting from the operation of the interrogator-responser equipment.

Figure 2:
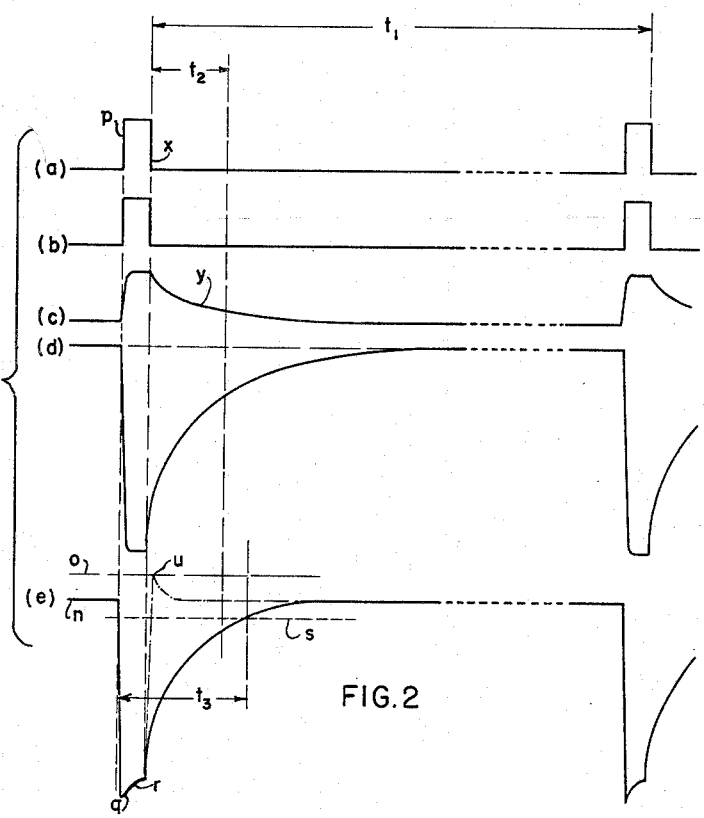
Figure 3:
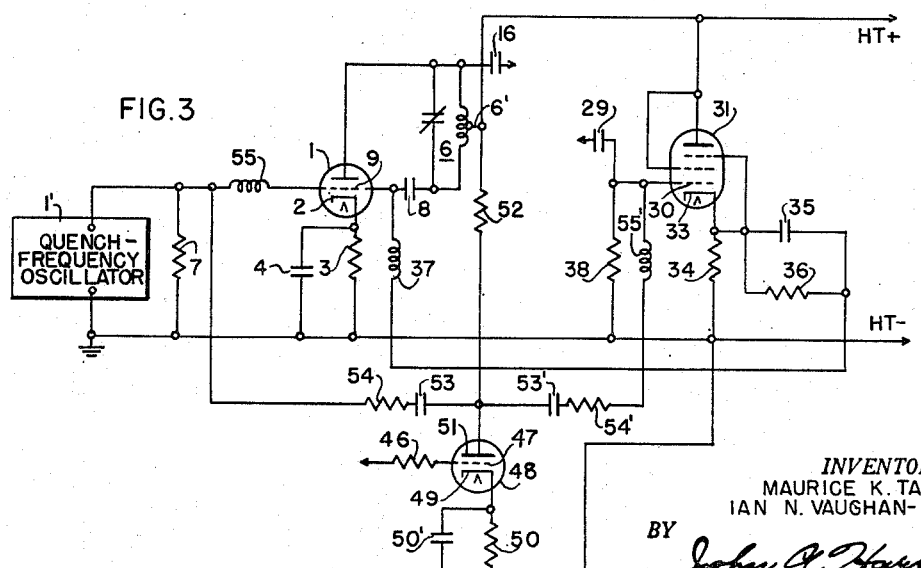

In order that the various features of the invention may be more readily understood, embodiments thereof will now be described by way of example with reference to the accompanying drawings, in which Fig. 1 is a circuit diagram of a responder of the type stated having interference suppression means according to one embodiment of the invention; Fig. 2 illustrates a number of voltage wave forms occurring at different points of the circuit arrangements of Fig. 1; Fig. 3 shows a modification of the arrangement shown in Fig. 1; and Fig. 4 shows a modification of the arrangements shown in Figs. 1 and 3.

Referring now to Fig. 1, the responder circuit there shown includes a triode receiving valve 1 arranged to operate upon the superregenerative principle with the aid of a separate quench-frequency oscillator 1'. The receiving valve 1 is arranged to form part of a Hartley-type oscillator with one end of a tuned circuit 6 connected directly to its anode and the other end of the tuned circuit connected by way of coupling condenser 8 to its control electrode 9. The cathode 2 of valve 1 is connected to the earthed negative pole, designated HT—, of the high-tension supply by way of a biasing network consisting of resistance 3 and shunting decoupling condenser 4. The control electrode 9 also is connected to the negative high-tension supply by way of a radio-frequency choke 55 and a grid-leak resistance 7, whereby the potential drop across the biasing network 3, 4, so biases the control electrode 9, under normal operating conditions, that self-oscillation in the circuit of valve 1 takes place only in the region of the maximum positive amplitude of the quenching oscillation provided by the quench-frequency oscillator in the known superregenerative manner. The quench-frequency oscillator applies its output to the control grid 9 by way of radio-frequency choke 55.

While the present invention is applicable to responders of the type stated having separate tuned circuits for receiving and retransmitting at either similar or different frequencies, for convenience of illustration the tuned circuit 6 is shown as also forming the oscillatory circuit of a second Hartley-type oscillator comprising the triode valve 12, which constitutes the response-signal transmitting valve of the responder. The anode of valve 12 is connected directly to that end of tuned circuit 6 which is connected to the anode of valve 1, while the control electrode 11 of valve 12 is connected by way of coupling condenser 10 to the other end of tuned circuit 6 in similar manner to the control electrode 9 of valve 1. The mid-point 6' of the inductance of tuned circuit 6 is connected to the positive pole, designated HT+, of the high-tension supply so as to provide the requisite anode potential of both valves 1 and 12. Antenna means used for both reception and retransmission purposes is connected to coil 5, inductively coupled to the inductance of tuned circuit 6. The tuning condenser of the tuned circuit 6 may be arranged, if desired, to be varied cyclically over its capacity variation range, whereby the resonant frequency of the tuned circuit 6 and, hence, the effective reception and retransmission frequency, may be varied cyclically over a chosen band of frequencies.

The cathode 13 of valve 12 is also connected to the negative high-tension supply by way of a biasing network comprising resistance 14 shunted by decoupling condenser 15. The potential drop across this network is arranged, in a manner described more fully hereinbelow, to be of a value such that the control electrode 11 has, under normal nonresponding conditions, a negative bias potential of sufficient voltage to prevent the valve 12 from oscillating.

The anode side of tuned circuit 6 is connected by way of condenser 16 to the anode 17 of a diode detector valve 18 whose cathode 19 is directly connected to the negative high-tension supply. A load resistance 20 is connected in shunt across the anode and cathode of this valve.

The anode 17 is connected by way of a radio-frequency choke coil 21 to control electrode 22 of a pentode amplifier valve 23 whose cathode 24 is connected to the negative high-tension supply by way of a biasing network comprising resistance 25 and decoupling condenser 26. The anode 27 of this valve is connected to the positive high-tension supply by way of load resistor 28, while the screen and suppressor electrodes are provided with connections, not shown, in the normal manner customary for an amplifier valve.

Anode 27 further is connected by way of coupling condenser 29 to control electrode 30 of an additional pentode valve 31, the control electrode 30 being also connected to the negative high-tension supply by way of grid-leak resistance 38. Anode 32 and screen electrode 32' of this valve are strapped together and are connected directly to the positive high-tension supply. The suppressor electrode 33' of valve 31 is connected directly to the cathode 33, which is in turn connected to the negative high-tension supply by way of a load resistance 34, whereby this valve 31 operates in the manner of a cathode-follower stage.

The cathode 33 also is joined to one end of a parallel-connected resistance 36 and condenser 35, forming a pulse-widening or integrating circuit network, the other end of which is connected by way of a radio-frequency choke coil 37 to the control electrode 11 of transmitting valve 12. By virtue of the direct-current path afforded by choke coil 37 and resistance 36 the control electrode 11 will be seen to have a potential relative to its associated cathode 13 which is determined by the potential across the load resistance 34 and the opposing potential across the bias resistor 14. As already indicated, the value of the latter potential is arranged, under normal nonresponding conditions, to have a value exceeding that of the former by an amount sufficient to bias the transmitting valve 12 to a nonoscillating condition.

The arrangement so far described, which constitutes the receiver and transmitter means of a responder of the type stated and is of already known form, operates in the following manner. Incoming interrogation signal pulses are picked up by the antenna means associated with the coil 5, are applied to tuned circuit 6 and upon the tuning of the latter to resonance therewith are received superregeneratively by valve 1. The received and amplified signals are then applied to diode valve 18, where they are rectified to produce a rectified output signal across load resistance 20. This rectified signal, in the form of pulse signals of negative polarity at the anode end of resistance 20, is applied to the pentode amplifier valve 23 to produce an amplified output pulse of positive polarity at the anode 27 of the latter valve. This pulse is then applied to the cathode-follower valve 31 to cause, in the usual known manner, the development of a similar output pulse of positive polarity across the cathode load resistor 34. Each of these pulses is applied, after passage through the network 35, 36 which causes the pulse time duration to be suitably extended or "widened," to the control electrode 11 of transmitting valve 12, where it increases the control-electrode potential to a positive value such that violent oscillation of the valve takes place. This results in the transmission of a response pulse-modulated wave signal from the antenna connected to coil 5. The duration of each pulse of this response signal is determined by a number of factors, among which are the time constants of the pulse-widening circuit 35, 36 and the biasing network 14, 15 of the transmitting valve 12. For successful operation these time constants and the time constant of the biasing network 3, 4 of the receiving valve 1 have to be of appropriate predetermined values chosen in accordance with principles well known in the art.

In addition to the conventional portions of the responder apparatus, operating as just described, it may be advantageous to include an arrangement for preventing the retransmission of signals from a responder of the type stated during the periods of operation of a nearby pulse-modulated radar equipment. In this way the responder is left free to operate in its normal way during only those intermediate periods lying between the end of one operative scan of the nearby radar display system and the commencement of the next following display scan. Although such intermediate periods may appear to be short, they are usually much greater than the related radar display scanning periods so that the responder is free to operate effectively, in a series of short periods, during the greater proportion of the total time during which both the responder and the nearby radar equipment are in use. As an example the radar equipment may radiate exploring pulses at the rate of 500 per second, each pulse being followed by an operative display scanning period of 200 microseconds. In association with such radar equipment the responder embodying the present invention would be free to operate normally for a maximum period of 1800 microseconds after each scanning period of the nearby radar equipment, i. e., a total of 500×1800 microseconds=900 milliseconds in every second or nine-tenths of the total time period of conjoint use.

For the purpose of preventing the retransmission of response signals in the manner described above during the operative periods of a nearby radar equipment, an input circuit is provided which is adapted to receive from a source of control signals 39', which in turn is coupled to timing circuits in the radar equipment (not shown), a suitable potential change occurring in timed relation to and just prior to the instant of commencement of each operative period of the radar equipment. While a potential change in the form of a voltage pulse of negative polarity may be utilized in equipment of the general type described herein, the equipment and its operation are described for convenience with reference to a controlling potential change of positive polarity. Thus, in one general form of radar equipment, with which the present illustrated embodiment of the invention is adapted to co-operate, each cathode-ray tube display scan is initiated by the trailing edge of a pulse of positive polarity and substantially rectangular wave form, such as that shown at diagram $a$ of Fig. 2. This pulse, although short, is usually 5 to 20 times the duration of the response-signal pulse used with the present responder, and use may be made of such a potential change of pulse wave form in the present embodiment of the invention for effecting the required suppression of the responder during the radar operation periods, the period of suppression commencing practically simultaneously with the leading edge of such pulse.

The apparatus provided comprises a unilaterally conductive device in the form of a diode valve 42 whose anode 41 is connected by way of resistance 40 and condenser 39 to the center terminal of source 39' remote from earth. The connection to source 39' conveniently may be made through a shielded concentric-type cable whose outer shielding conductor is connected directly to the earthed negative high-tension supply. The cathode 43 of valve 42 is connected to the negative high-tension supply by way of load network 44 comprising a parallel-connected resistance and capacitance. A resistance 45 is connected across the series combination of diode valve 42 and resistance 40, completing the input circuit coupled to source 39'.

The cathode 43 is also connected by way of a direct-current path comprising a grid-bias battery, designated GB, and a resistance 46 to control electrode 47 of a triode valve 48, whose cathode 49 is connected to the negative high-tension supply by way of a biasing network comprising resistance 50 and shunting decoupling condenser 50'. Anode 51 of valve 48 is joined to the positive high-tension supply by way of load resistance 52.

The anode 51 of valve 48 also is connected to the control electrode 9 of receiving valve 1 by way of series-connected condenser 53, resistance 54, and the radio-frequency choke 55.

In the operation of this suppression apparatus, a signal having the wave form shown in diagram $a$, Fig. 2, is received at the input circuit from the source 39' coupled to the nearby radar equipment. This wave form will be seen to comprise a series of potential changes in the form of a series of pulses $p$ of positive polarity and rectangular wave shape separated by time intervals $t_1$ determined by the pulse-recurrence frequency of the particular radar equipment. The trailing edge $x$ of each pulse $p$ conventionally is caused to initiate the commencement of an operative display scan of the radar cathode-ray tube, such scan lasting for the time period $t_2$ after each pulse. In practice $t_1$ is usually of the order of 1 to 5 milliseconds while $t_2$ is usually of the order of 200 to 600 microseconds according to the type of radar equipment.

The application of each pulse $p$ causes, as shown in diagram $b$, Fig. 2, a steep rise in the potential of the anode 41 of diode valve 42 coincident with the leading edge of the pulse and a correspondingly steep fall at the trailing edge of the pulse. The resulting potentials of the cathode 43 of valve 42 are shown in diagram c of Fig. 2, from which it will be seen that there is a corresponding rise at the leading edge of the pulse. This potential rise, however, is rather less steep than that of the anode of tube 42 due to the effect of the series resistance of the diode valve in association with the capacitance of the network 44. Upon the termination of the input pulse, the diode becomes non-conductive and the capacitance of the network 44 is left to discharge at a rate determined by the time constant of the network. This time constant is made relatively long so as to provide a derived voltage pulse having an extended sloping trailing edge of exponential decay form as shown at y in diagram c. The decay time of this sloping trailing edge is arranged, as shown, to be somewhat in excess of the time period $t_2$ of diagram a.

The term "sloping trailing edge" as used herein is intended to mean that the time taken for the last-mentioned derived voltage pulse to decay from its maximum to its minimum value upon the termination thereof is of appreciable finite value instead of the instantaneous change which occurs in an ideal form of square sided pulse. Such sloping trailing edge has the effect, in the manner described later, of reducing or avoiding the possibility of spurious triggering of the responder at the instant of removal of the suppression voltage and also of suitably extending the effective period of the pulse. The amount of slope or decay time provided at the trailing edge is dependent upon the characteristics of the circuit or circuits to which it is applied and is, of course, adjusted in practice to have an adequate but not excessive value since undue prolongation of the decay time will lessen unnecessarily the time period when the responder is effective to perform its normal function.

While the sloping trailing edge may be achieved in various ways, for example, by initiating the controlled charge or discharge of a condenser by means of a valve such as a pentode, conveniently such trailing edge is given an extended exponential form by the provision, in the pulse-deriving means, of a circuit network having a suitably long time constant. In order that only the trailing edge and not both leading and trailing edges of the voltage pulse may be given such exponential form, such circuit network is desirable associated with a unilaterally conductive device such as the diode valve 42.

The output pulse developed across the network 44 is applied over the direct-current path of battery GB and resistance 46 to the control electrode 47 of a valve 48. This valve is normally biased by the battery GB to anode-current cutoff, so that upon application of the pulse the anode potential falls rapidly, as shown in diagram d of Fig. 2, from a value substantially equal to that of the high-tension supply, then remains at a low value for the duration of the pulse and subsequently rises gradually, following the extended sloping trailing edge of the pulse of diagram c. This output pulse appearing at the anode 51 of valve 48, is applied to the control electrode 9 of valve 1.

The resultant control-electrode potential changes with respect to the cathode 2, and the suspension from normal operation of the valve 1 is illustrated by diagram e of Fig. 2. As already explained, the normal standing potential of control electrode 9 with respect to cathode 2 is negative by an amount suitable to proper superregenerative operation. This is indicated by the displacement of the standing potential level n in diagram e below the cathode potential level o. Upon application of the negative pulse of diagram d, the control electrode 9 is driven excessively negative to point q coincident with the leading edge of the pulse p. This causes complete cutoff of anode current in valve 1, and the grid-to-cathode potential subsequently rises slightly as shown at r in diagram e due to the exponential discharge of the biasing network 3, 4 which was originally contributing the standing potential $n-o$. This condition persists substantially until the end of the pulse p, whereupon the control-electrode potential rises gradually in conformity with the exponential form of the trailing edge of the pulse of diagram d until it attains the critical operating level n. By that time the rise of control-electrode voltage due to the potential change of the anode 51 is substantially offset by the increase in the opposing bias potential developed across the network 3, 4 due to resumed anode-current flow in the receiving valve 1. The cutoff level of the grid potential of valve 1 is indicated in diagram e by dotted line s, and it will be seen that valve 1 is held completely cutoff and hence inoperative for the period $t_3$, which includes and extends beyond the end of the operative period $t_2$ of the associated radar equipment.

The desirability of the extended sloping trailing edge of the pulse wave form of diagram c may be illustrated by reference to the dot-and-dash portion of diagram e, which illustrates the operation when such form of trailing edge is not provided. As already explained, the potential of control electrode 9 rises by an amount about equal to $n-o$ from the point q, due to the discharge of biasing network 3, 4. If, at the end of the pulse p, the negative pulse voltage is suddenly removed from the control electrode 9, the potential of the latter rises to equal the potential of the related cathode 2, as shown at u in diagram e, and only resumes its normal negative value after the condenser 4 of the biasing network has had time to recharge. Such reduced bias condition may readily result in the development, within the tuned circuit 6, of an oscillation of sufficient amplitude to initiate triggering of the transmitting valve 12 in a manner similar to that already described and hence the radiation of a spurious response signal. Furthermore, with the arrangement as described the responder receiving valve 1 will be restored to operative condition before the termination of the operative period $t_2$ of the nearby radar equipment. This latter difficulty could, however, be avoided by the interposition of appropriate phase delay means either between the nearby radar equipment and the input circuit or at a suitable point in the circuit of valves 42 and 48.

The purpose of resistance 40, which is in series with diode valve 42, is to prevent the possible pickup of response signals, retransmitted from the responder of the type stated, and rectification thereof by the circuit of diode valve 42, thereby to produce a positive potential at the cathode 43 of valve 42 sufficient to cause unwanted suppression of operation of the responder. Resistance 40 and the self-capacitance of diode valve 42 act in effect as a radio-frequency filter serving to eliminate such coupled signals from the anode 41.

The invention is also applicable to other forms of responders of the type stated, for example to the form embodying a common valve for both receiving and retransmitting purposes in place of the separate receiving and retransmitting valves 1 and 12 respectively employed in the embodiment just described.

Fig. 3 illustrates the necessary modifications in one such embodiment of the invention. In this instance the separate transmitting valve 12 is dispensed with, and the connection from cathode 33 of valve 31 is taken to control electrode 9 of valve 1 by way of pulse-width controlling circuit 35, 36 and radio-frequency choke 37. In applying the invention not only is a connection made from anode 51 of valve 48 to control electrode 9 of valve 1 by way of condenser 53, resistance 54 and radio-frequency choke 55, but a further connection is also made from anode 51 to the control electrode 30 of valve 31 by way of the series connection of a condenser 53', resistance 54' and a radio-frequency choke 55'. This latter connection is necessary, with application of the negative suppression pulse to the cathode 33 of valve 31, since in this case cathode 33 is coupled to control electrode 9 of valve 1 and unless a similar negative pulse is applied to control electrode 30 of valve 31 to ensure that throughout the duration of the suppression pulse the neative control electrode-to-cathode bias of valve 31 is not decreased, it would be impracticable to apply the pulse to the control electrode 9 and the interconnected cathode 33 due to the effectively low-impedance load in the cathode lead of the valve 31. A responder of the type having a single receive-transmit valve is described in greater detail in the copending application of Hubert Wood, entitled "Wave-Signal Responder System," Serial No. 762,732, filed July 22, 1947, now Patent No. 2,576,495, granted November 27, 1951.

In any of the above described embodiments of the invention, the arrangement shown in Fig. 4 may be used instead of the grid-bias battery GB, to ensure that valve 48 becomes biased beyond anode-current cutoff after the cessation of the suppression pulse from the local radar equipment. In this alternative arrangement a second resistance 71 is connected between load resistance 52 and the positive pole of the high-tension supply. The common point of these resistances is then joined by way of another resistance 72 to the cathode 49 of valve 48. The values of resistance 50, 72, 71 are such as to prevent grid 47 becoming positive with respect to cathode 49 until near the end of the positive swing developed across network 44 at the start of the period of operation of the local radar equipment.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal transpondor system, adapted for use in association with a near-by pulse-modulation radar or interrogator-responser equipment which in each operating period thereof transmits a signal pulse of a given carrier frequency and utilizes a reply signal pulse of a related carrier frequency returned within a predetermined interval following the transmission of said first-mentioned signal pulse, comprising: pulse-modulation receiver and transmitter means including a control circuit for energizing the transmitter unit of said means in response to the reception of a signal pulse by the receiver unit of said means, said receiver unit being subject to the undesired reception of wave-signal energy resulting from the operation of said interrogator-responser equipment; an input circuit to which is applied a potential change initiated not later than the start of said each operating period of said interrogator-responser equipment; means, including a circuit network having a relatively long time constant, and having a unilaterally conductive device coupled thereto for developing in response to said potential change a control-voltage pulse having a trailing edge of extended exponential form and having a duration at least equal to said each operating period of said interrogator-responser equipment; and means for applying said control-voltage pulse to said receiver unit effectively to disable said receiver unit during said each operating period of said interrogator-responser equipment to prevent undesirable interference otherwise produced by the operation of said receiver and transmitter means in response to the reception of wave-signal energy resulting from said operation of said interrogator-responser equipment.

2. A wave-signal transpondor system, adapted for use in association with a near-by pulse-modulation radar or interrogator-responser equipment which in each operating period thereof transmits a signal pulse of a given carrier frequency and utilizes a reply signal pulse of a related carrier frequency returned within a predetermined interval following the transmission of said first-mentioned signal pulse, comprising: pulse-modulation receiver and transmitter means including a superregenerative receiving valve and including a control circuit for energizing the transmitter unit of said means in response to the reception of a signal pulse by the receiver unit of said means, said receiver unit being subject to the undesired reception of wave-signal energy resulting from the operation of said interrogator-responser equipment; an input circuit to which is applied a potential change initiated not later than the start of said each operating period of said interrogator-responser equipment; means for developing in response to said potential change a control-voltage pulse having a duration at least equal to said each operating period of said interrogator-responser equipment; and means for applying said control-voltage pulse to said receiving valve effectively to disable said receiver unit during said each operating period of said interrogator-responser equipment to prevent undesirable interference otherwise produced by the operation of said receiver and transmitter means in response to the reception of wave-signal energy resulting from said operation of said interrogator-responser equipment.

3. A wave-signal transpondor system, adapted for use in association with a near-by pulse-modulation radar or interrogator-responser equipment which in each operating period thereof transmits a signal pulse of a given carrier frequency and utilizes a reply signal pulse of a related carrier frequency returned within a predetermined interval following the transmission of said first-mentioned signal pulse, comprising: pulse-modulation receiver and transmitter means including an amplifier valve and a control circuit for energizing the transmitter unit of said means in response to the reception of a signal pulse by the receiver unit of said means, said receiver unit being subject to the undesired reception of wave-signal energy resulting from the operation of said interrogator-responser equipment; an input circuit to which is applied a potential change initiated not later than the start of said each operating period of said interrogator-responser equipment; means, including a circuit network having a relatively long time constant, and having a unilaterally conductive device coupled thereto for developing in response to said potential change a control-voltage pulse having a trailing edge of extended exponential form and having a duration at least equal to said each operating period of said interrogator-responser equipment; and means for applying said control-voltage pulse simultaneously to at least one of said units and to said amplifier valve effectively to disable at least said one unit and said amplifier valve during said each operating period of said interrogator-responser equipment to prevent undesirable interference otherwise produced by the operation of said receiver and transmitter means in response to the reception of wave-signal energy resulting from said operation of said interrogator-responser equipment.

4. A wave-signal transpondor system, adapted for use in association with a near-by pulse-modulation radar or interrogator-responser equipment which in each operating period thereof transmits a signal pulse of a given carrier frequency and utilizes a reply signal pulse of a related carrier frequency returned within a predetermined interval following the transmission of said first-mentioned signal pulse, comprising: pulse-modulation receiver and transmitter means including a superregenerative receiving valve and including a control circuit for energizing the transmitter unit of said means in response to the reception of a signal pulse by the receiver unit of said means, said receiver unit being subject to the undesired reception of wave-signal energy resulting from the operation of said interrogator-responser equipment; an input circuit to which is applied a potential change initiated not later than the start of said each operating period of said interrogator-responser equipment; means, including a circuit network having a relatively long time constant, and having a unilaterally conductive device coupled thereto for developing in response to said potential change a control-voltage pulse having a trailing edge of extended exponential form and having a duration at least equal to said each operating period of said interrogator-responser equipment; and means for applying said control-voltage pulse to said receiving valve effectively to disable said receiver unit during said each operating period of said interrogator-responser equipment to prevent undesirable interference otherwise produced by the operation of said receiver and transmitter means in response to the reception of wave-signal energy resulting from said operation of said interrogator-responser equipment.

5. A wave-signal transpondor system, adapted for use in association with a near-by pulse-modulation radar or interrogator-responser equipment which in each operating period thereof transmits a signal pulse of a given carrier frequency and utilizes a reply signal pulse of a related carrier frequency returned within a predetermined interval following the transmission of said first-mentioned signal pulse, comprising: pulse-modulation receiver and transmitter means including a control circuit for energizing the transmitter unit of said means in response to the reception of a signal pulse by the receiver unit of said means, said receiver unit being subject to the undesired reception of wave-signal energy resulting from the operation of said interrogator-responser equipment; an input circuit to which is applied a potential change initiated not later than the start of said each operating period of said interrogator-responser equipment; means, including a circuit network having a relatively long time constant, and having a unilaterally conductive device coupled thereto for developing in response to said potential change a control-voltage pulse having a trailing edge of extended exponential form and having a duration at least equal to said each operating period of said interrogator-responser equipment; and means for applying said control-voltage pulse to at least one of said units effectively to disable at least said one unit during said each operating period of said interrogator-responser equipment to prevent undesirable interference otherwise produced by the operation of said receiver and transmitter means in response to the reception of wave-signal energy resulting from said operation of said interrogator-responser equipment.

6. A wave-signal transpondor system, adapted for use in association with a near-by pulse-modulation radar or interrogator-responser equipment which in each operating period thereof transmits a signal pulse of a given carrier frequency and utilizes a reply signal pulse of a related carrier frequency returned within a predetermined interval following the transmission of said first-mentioned signal pulse, comprising: pulse-modulation receiver and transmitter means including a valve common thereto having a control electrode and including a control circuit having a cathode-coupled amplifier stage therein for energizing the transmitter unit of said means in response to the reception of a signal pulse by the receiver unit of said means, said receiver unit being subject to the undesired reception of wave-signal energy resulting from the operation of said interrogator-responser equipment; an input circuit to which is applied a potential change initiated not later than the start of said each operating period of said interrogator-responser equipment; means for developing in response to said potential change a control-voltage pulse having a duration at least equal to said each operating period of said interrogator-responser equipment; and means for applying said control-voltage pulse to said control electrode of said common valve and to said cathode-coupled amplifier stage effectively to disable said common valve and said cathode-coupled amplifier stage during said each operating period of said interrogator-responser equipment to prevent undesirable interference otherwise produced by the operation of said receiver and transmitter means in response to the reception of wave-signal energy resulting from said operation of said interrogator-responser equipment.

7. A wave-signal transpondor system, adapted for use in association with a near-by pulse-modulation radar or interrogator-responser equipment which in each operating period thereof transmits a signal pulse of a given carrier frequency and utilizes a reply signal pulse of a related carrier frequency returned within a predetermined interval following the transmission of said first-mentioned signal pulse, comprising: pulse-modulation receiver and transmitter means including a control circuit for energizing the transmitter unit of said means in response to the reception of a signal pulse by the receiver unit of said means, said receiver unit being subject to the undesired reception of wave-signal energy resulting from the operation of said interrogator-responser equipment; an input circuit to which is applied a voltage pulse of positive polarity and substantially rectangular wave form initiated not later than the start of said each operating period of said interrogator-responser equipment; means including a unilaterally conductive device coupled in series with a parallel-connected resistor-condenser network for developing in response to said potential change a control-voltage pulse having a duration at least equal to said each operating period of said interrogator-responser equipment; an impedance coupled to said unilaterally conductive device for preventing unwanted suppression of said responder system otherwise caused by rectification by said unilaterally conductive device of wave signals coupled into said last-mentioned means from said receiver and transmitter means during the periods of energization thereof; and means for applying said control-voltage pulse to at least one of said units effectively to disable at least said one unit during said each operating period of said interrogator-responser equipment to prevent undesirable interference otherwise produced by the operation of said receiver and transmitter means in response to the reception of wave-signal energy resulting from said operation of said interrogator-responser equipment.

MAURICE K. TAYLOR.
IAN N. VAUGHAN-JONES.

References Cited in the file of this patent

UNITED STATES PATENTS

| Number | Name | Date |
| --- | --- | --- |
| 2,134,716 | Gunn | Nov. 1, 1938 |
| 2,277,731 | Tooth | Mar. 31, 1942 |
| 2,415,318 | Wheeler | Feb. 4, 1947 |
| 2,415,667 | Wheeler | Feb. 11, 1947 |
| 2,419,564 | Keister | Apr. 29, 1947 |
| 2,427,523 | Dolberg et al. | Sept. 16, 1947 |
| 2,433,681 | Blumlein | Dec. 30, 1947 |
| 2,440,250 | Deloraine et al. | Apr. 27, 1948 |
| 2,446,819 | Fyler | Aug. 10, 1948 |
| 2,453,970 | Charrier | Nov. 16, 1948 |
| 2,454,396 | Malling | Nov. 23, 1948 |
| 2,460,202 | Tyson | Jan. 25 1949 |